US011900707B2

(12) United States Patent
Kameda et al.

(10) Patent No.: US 11,900,707 B2
(45) Date of Patent: Feb. 13, 2024

(54) SKELETON INFORMATION DETERMINATION APPARATUS, SKELETON INFORMATION DETERMINATION METHOD AND COMPUTER PROGRAM

(71) Applicant: NIPPON TELEGRAPH AND TELEPHONE CORPORATION, Tokyo (JP)

(72) Inventors: Akio Kameda, Musashino (JP); Megumi Isogai, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 114 days.

(21) Appl. No.: 17/594,917

(22) PCT Filed: May 16, 2019

(86) PCT No.: PCT/JP2019/019584
§ 371 (c)(1),
(2) Date: Nov. 3, 2021

(87) PCT Pub. No.: WO2020/230335
PCT Pub. Date: Nov. 19, 2020

(65) Prior Publication Data
US 2022/0309819 A1  Sep. 29, 2022

(51) Int. Cl.
*G06V 40/10* (2022.01)
*G06T 7/70* (2017.01)

(52) U.S. Cl.
CPC ............... *G06V 40/10* (2022.01); *G06T 7/70* (2017.01); *G06T 2207/30196* (2013.01)

(58) Field of Classification Search
CPC .. G06V 40/10; G06T 7/70; G06T 2207/30196
See application file for complete search history.

(56) References Cited

U.S. PATENT DOCUMENTS 11,354,938 B2 *  6/2022  Shimshoni ............. H04N 23/60
2013/0077820 A1 *  3/2013  Marais ................ G06F 18/2148
                                                         382/103
(Continued)

FOREIGN PATENT DOCUMENTS

CA            2928601 C  *  8/2022   ......... G06K 9/00369

OTHER PUBLICATIONS

Cao, Zhe, et al. "Realtime multi-person 2d pose estimation using part affinity fields." Proceedings of the IEEE conference on computer vision and pattern recognition. (Year: 2017).*

(Continued)

*Primary Examiner* — Shaghayegh Azima
(74) *Attorney, Agent, or Firm* — Harness, Dickey & Pierce, P.L.C.

(57) ABSTRACT

A skeletal information threshold setting apparatus includes: a joint information input unit that accepts an input of important joints among joints of a subject and a confidence threshold for the important joints; and a threshold setting unit that acquires a confidence threshold for each of multiple joints of the subject, including the important joints, based on the important joints and the confidence threshold for the important joints that were input, and sets the acquired confidence thresholds for the joints as thresholds to be used in making a determination regarding a skeletal estimation result for the subject.

8 Claims, 10 Drawing Sheets

(56) References Cited

U.S. PATENT DOCUMENTS

2020/0175713 A1* 6/2020 Pescaru .................... G06T 7/70
2022/0309819 A1* 9/2022 Kameda ............... G06V 40/103

OTHER PUBLICATIONS

Zhe Cao, Tomas Simon, Shih-En Wei, Yaser Sheikh, "Realtime Multi-Person 2D Pose Estimation using Part Affinity Fields", <URL:https://arxiv.org/abs/1611.08050>, arXiv:1611.08050v2 [cs.CV] Apr. 14, 2017.
"CMU-Perceptual-Computing-Lab/openpose", <URL:https://github.com/CMU-Perceptual-Computing-Lab/openpose/blob/master/doc/output.md>, retrieved on Mar. 28, 2019.

* cited by examiner

| JOINT POINT | COORDINATES | CONFIDENCE SCORE |
|---|---|---|
| 1 | x1, y1 | c1=0.9 |
| 2 | x2, y2 | c2=0.7 |
| 3 | x3, y3 | c3=0.7 |
| 4 | x4, y4 | c4=0.3 |
| ⋮ | ⋮ | ⋮ |
| 13 | x13, y13 | c13=0.5 |
| 14 | x14, y14 | c14=0.2 |

FIG. 17

| | THRESHOLD VALUE FOR JOINT BETWEEN ARBITRARY JOINT AND IMPORTANT JOINT OR ARBITRARY JOINT | CONCEPT | THRESHOLD VALUE FOR JOINT BETWEEN IMPORTANT JOINT AND IMPORTANT JOINT | CONCEPT |
|---|---|---|---|---|
| METHOD IN SECOND EMBODIMENT | LINEAR INTERPOLATION | IMPORTANCE ON QUALITY OF IMPORTANT JOINT POINTS | LINEAR INTERPOLATION | HIGH IMPORTANCE ALSO FOR JOINTS BETWEEN IMPORTANT JOINTS |
| METHOD IN THIRD EMBODIMENT | LINEAR INTERPOLATION | IMPORTANCE ON QUALITY OF IMPORTANT JOINT POINTS | LINEAR INTERPOLATION WITH cmin FOR INTERMEDIATE POINTS | IMPORTANCE ON QUALITY OF IMPORTANT JOINT POINTS |
| METHOD IN FOURTH EMBODIMENT | LINEAR INTERPOLATION | IMPORTANCE ON QUALITY OF IMPORTANT JOINT POINTS | UNIFORM cmin | LOW IMPORTANCE FOR JOINTS BETWEEN IMPORTANT |
| [REF] CONVENTIONAL TECHNOLOGY | FIXED VALUE | IMPORTANCE ON QUALITY OF ALL JOINTS | FIXED VALUE | IMPORTANCE (SAME) ON QUALITY FOR ALL JOINTS |

| JOINT POINT | COORDINATES | CONFIDENCE SCORE |
|---|---|---|
| 1 | x1, y1 | c1 |
| 2 | x2, y2 | c2 |
| 3 | x3, y3 | c3 |
| 4 | x4, y4 | c4 |
| ⋮ | ⋮ | ⋮ |
| 13 | x13, y13 | c13 |
| 14 | x14, y14 | c14 |

SKELETON INFORMATION DETERMINATION APPARATUS, SKELETON INFORMATION DETERMINATION METHOD AND COMPUTER PROGRAM

CROSS-REFERENCE TO RELATED APPLICATIONS

This application is a 371 U.S. National Phase of International Application No. PCT/JP2019/019584 filed on May 16, 2019. The entire disclosure of the above application is incorporated herein by reference.

TECHNICAL FIELD

The present invention relates to a skeletal information determination device, a skeletal information determination method, and a computer program.

BACKGROUND ART

Conventionally, the state of a photographed person (e.g., the posture of the person) has been analyzed based on skeleton information of the human body obtained from an image (e.g., see NPD 1 and 2). For example, in the technique disclosed in NPD 1, for various joint points n (n is 1 to N, and N is the total number of joints) of a human body, two-dimensional XY coordinates (xn, yn) and a confidence score cn ($0 \leq cn \leq 1$) can be obtained from a still image (frames in the case of a moving image) as skeletal information. The closer the value of the confidence score cn is to 1, the higher the reliability of the estimation result is, and conversely, the closer the value is to 0, the lower the reliability of the estimation result is.

FIG. 18 is a diagram showing an example of joint points of a human body, and FIG. 19 is a diagram showing an example of skeletal information in a frame.

In the example shown in FIG. 18, 14 joint points are shown as joint points of the human body. Also, in the example shown in FIG. 19, two-dimensional XY coordinates (x1, y1) to (x14, y14) and confidence scores c1 to c14 are associated with joint points n=1 to 14.

Conventionally, the state of a photographed person (e.g., the posture of the person) has been analyzed using skeletal information estimation results obtained as described above.

CITATION LIST

Non Patent Document

[NPD 1] Zhe Cao, Tomas Simon, Shih-En Wei, Yaser Sheikh, "Realtime Multi-Person 2D Pose Estimation using Part Affinity Fields", <URL: https://arxiv.org/abs/1611.08050>, arXiv:1611.08050v2 [cs.CV] 14 Apr. 2017.
[NPD 2] "CMU-Perceptual-Computing-Lab/openpose", <URL:https://github.com/CMU-Perceptual-Computing-Lab/openpose/blob/master/doc/output.md>.

SUMMARY OF THE INVENTION

Technical Problem

However, the estimated positions of the joint points are not necessarily correct, and there are cases where joint points are erroneously recognized or cannot be acquired. In the following description, the case of erroneously recognizing a joint point is referred to as a skeletal estimation error.

In the case of a skeletal estimation error or the case where skeletal information cannot be obtained, even if state analysis is performed, the state analysis is not accurate. In the following description, such a case where accurate state analysis cannot be performed is referred to as a state analysis error. For this reason, conventionally, it has been necessary to visually determine the quality of the skeletal estimation results in advance and manually remove (cleanse) images that cannot be used for state analysis. Such manual cleansing is a burdensome task for the user and requires work time, thus making real-time processing difficult. In view of this, there is demand for a technique that can automatically determine the quality of skeletal estimation results of a subject.

In view of the above circumstances, an object of the present invention is to provide a technique capable of determining the quality of skeletal estimation results of a subject.

Means for Solving the Problem

One aspect of the present invention is a skeletal information threshold setting apparatus including: a joint information input unit configured to accept an input of an important joint among multiple joints of a subject and a confidence threshold for the important joint; and a threshold setting unit configured to acquire a confidence threshold for each of multiple joints of the subject including the important joint based on the important joint and the confidence threshold for the important joint that were input, and to set the acquired confidence thresholds for the joints as thresholds to be used in making a determination regarding a skeletal estimation result for the subject.

Another aspect of the present invention is the skeletal information threshold setting apparatus described above, wherein the threshold setting unit acquires a threshold for a non-important joint based on the distance from the important joint.

Another aspect of the present invention is the skeletal information threshold setting apparatus described above, wherein the threshold setting unit sets a higher threshold for the important joint among the multiple joints of the subject than for a non-important joint.

Another aspect of the present invention is the skeletal information threshold setting apparatus described above, wherein the threshold setting unit sets a lower threshold, which is smaller than the threshold set for the important joint, the greater the distance from the important joint is.

Another aspect of the present invention is the skeletal information threshold setting apparatus described above, wherein the threshold setting unit acquires, through linear interpolation, confidence thresholds for a non-important joint located between important joints, a non-important joint located between an important joint and an arbitrary joint for which a threshold was set in advance, and a non-important joint located between arbitrary joints for which a threshold was set in advance.

Another aspect of the present invention is the skeletal information threshold setting apparatus described above, wherein the threshold setting unit acquires, through linear interpolation, confidence thresholds for a non-important joint located between an important joint and an arbitrary joint for which a threshold was set in advance, and a non-important joint located between arbitrary joints for which a threshold was set in advance, and sets a predetermined value as a threshold for an intermediate point between important joints and acquires, through linear interpolation, a confidence threshold for a non-important joint located between important joints.

Another aspect of the present invention is the skeletal information threshold setting apparatus described above, wherein the threshold setting unit acquires, through linear interpolation, confidence thresholds for a non-important joint located between an important joint and an arbitrary joint for which a threshold was set in advance, and a non-important joint located between arbitrary joints for which a threshold was set in advance, and sets a pre-set predetermined value as a confidence threshold for a non-important joint located between important joints.

Another aspect of the present invention is a skeletal information threshold setting method including: a joint information input step of accepting an input of an important joint among multiple joints of a subject and a confidence threshold for the important joint; and a threshold setting step of acquiring a confidence threshold for each of multiple joints of the subject including the important joint based on the important joint and the confidence threshold for the important joint that were input, and setting the acquired confidence thresholds for the joints as thresholds to be used in making a determination regarding a skeletal estimation result for the subject.

Another aspect of the present invention is a computer program for causing a computer to function as the skeletal information threshold setting apparatus described above.

Effects of the Invention

According to the present invention, it is possible to determine the quality of skeletal estimation results of a subject.

BRIEF DESCRIPTION OF DRAWINGS

FIG. 17 is a diagram for describing a difference in the threshold setting method between the present invention and conventional technology.

DESCRIPTION OF EMBODIMENTS

Figure 1:
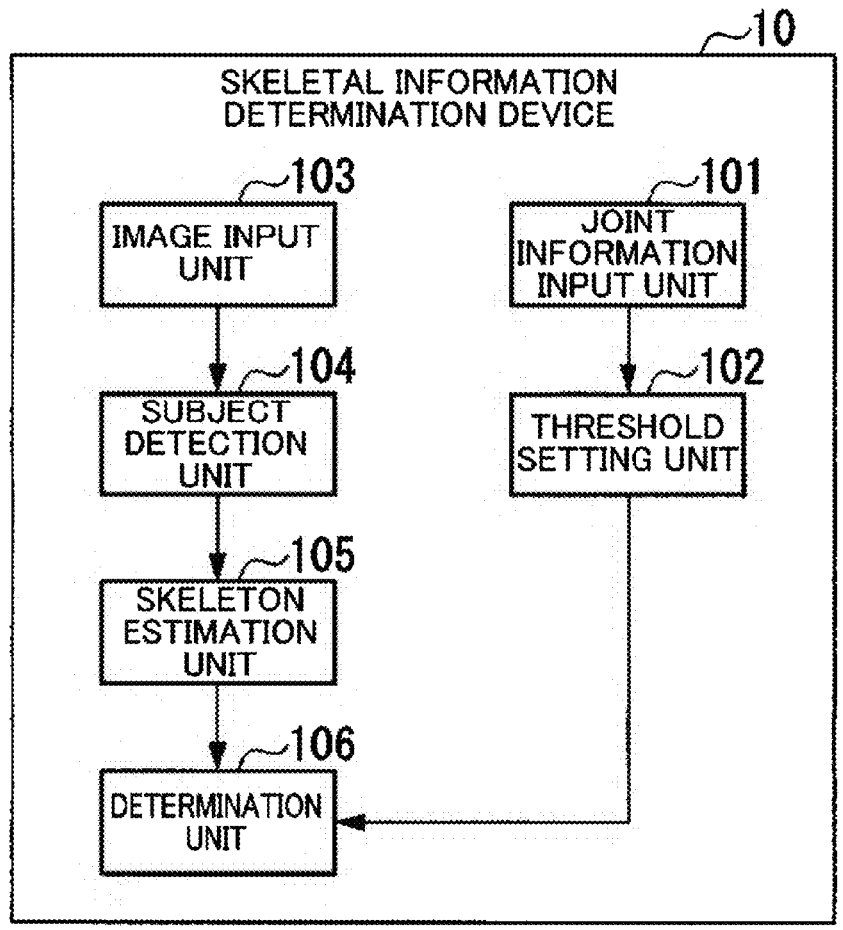
FIG. 1 is a schematic block diagram showing a configuration of a skeletal information determination device according to a first embodiment.

Hereinafter, an embodiment of the present invention will be described with reference to the drawings.

(Overview)

First, an overview of a skeletal information determination device of the present invention will be described.

The skeletal information determination device of the present invention estimates the skeletal information of a subject that appears in an input image, and determines, based on the estimated skeletal information, whether or not the skeletal information obtained from the input image is to be used to estimate the state of the subject. More specifically, first, the skeletal information determination device receives joint information that has been set in advance by a user. The joint information is information regarding joints of the subject. For example, the joint information includes type information regarding important joints (hereinafter referred to as "important joints") an non-important joints (hereinafter referred to as "arbitrary joints") among joints of the subject indicated by the skeletal information, as well as confidence thresholds creq for the important joints and confidence thresholds cmin for specified joints among the arbitrary joints. Here, the specified joints among the arbitrary joints are joints that are not important joints and have been given a confidence threshold in advance by the user. Examples of specified joints include a distal joint of the subject such as a wrist or an ankle, and the center of the neck or hips. The confidence threshold is a threshold used for determining the quality of a confidence score obtained as the skeletal information estimation result.

The confidence threshold creq for an important joint is set to a higher value between 0 and 1. In the following description, the confidence threshold creq for important joints is 0.9. The confidence threshold cmin for a specified joint is set to a lower value between 0 and 1. In the following description, the confidence threshold cmin for specified joints is 0.2.

Upon actually running OpenPose and checking the confidence scores, a confidence score having a value of 0.7 to 0.8 or higher was output when reasonably correct joint point coordinates were obtained for 30 sample images and skeletal information obtained from the images.

Next, in the case of self-occlusion where some of the joints cannot be seen (e.g., to the extent that a joint on the left side of a person can be estimated by another person from the right side), the confidence score value tended to stay around 0.4 to 0.6.

Furthermore, in the case of erroneous detections that are clearly misaligned, or in cases where human estimation is difficult even during self-occlusion, the confidence score value was 0.2 or less, and the confidence score value was 0 if a joint was ultimately not detected. As one example in the check performed at this time, a confidence score value around 0.2 is a level at which the right wrist is mistaken for the left wrist. Furthermore, there were cases where if the confidence score value is 0.1 or lower, the point was mistaken for a portion of the background, and thus lower.

Accordingly, it is preferable to set the confidence threshold creq for important joints to about 0.7 to 0.8. Note that in particularly important cases, it may be set to about 0.9, but in such a case, the setting needs to be made in consideration of the shooting environment (a higher confidence score for skeletal information can be obtained).

Conversely, if the confidence threshold creq for important joints is too high (e.g., about 0.9), even if a confidence score of about 0.8, which is empirically considered to be no problem in practical use, is obtained, the number of cases where it is removed increases. Therefore, it is desirable that the confidence threshold creq for important joints is appropriately set according to the shooting environment and the like.

Regarding the confidence threshold cmin for specified joints, it is desirable to use (not remove) pieces of skeletal information as much as possible by setting the confidence threshold cmin to about 0 to 0.2, which is clearly deemed to be an error, if there is little effect on analysis. On the other hand, if importance is to be placed on preventing error propagation (state analysis error) in the next analysis, and there is concern about the effects of joint points having a very low confidence score, it is desirable to ensure the accuracy of the skeletal information by setting the confidence threshold cmin for a specified joint to 0.4 to 0.6 (although this is one example, error to the extent of self-occlusion is allowed).

Next, based on the received joint information, the skeletal information determination device sets the confidence thresholds of the joints for the joint points that correspond to the joints in the skeletal information. Next, the skeletal information determination device compares the set confidence thresholds for the joints with the confidence scores of the joints in the skeletal information obtained by conventional technology. At this time, the skeletal information determination device compares the confidence score of a joint with the threshold value for the same joint. Then, if the confidence score of even one of the joints falls below the threshold value, the skeletal information determination device determines that the skeletal information obtained from the input image is not to be used for estimating the state of the subject.

Through the above processing, the skeletal information determination device automatically determines the quality of the skeletal estimation result of the subject. The following describes the specific configuration of the skeletal information determination device.

FIRST EMBODIMENT

FIG. 1 is a schematic block diagram showing the configuration of a skeletal information determination device 10 according to a first embodiment.

The skeletal information determination device 10 is constituted by an information processing device such as a smartphone, a mobile phone, a tablet terminal, a notebook computer, or a personal computer. The skeletal information determination device 10 includes a CPU (Central Processing Unit), a memory, an auxiliary storage device, and the like, which are connected by a bus, and executes a determination program. By executing the determination program, the skeletal information determination device 10 functions as a device that includes a joint information input unit (joint information inputter 101, a threshold setting unit (threshold setter 102, an image input unit 103, a subject detection unit 104, a skeleton estimation unit 105, and a determination unit 106. Note that some or all of the functions of the skeletal information determination device 10 may be realized using hardware such as an ASIC (Application Specific Integrated Circuit), a PLD (Programmable Logic Device), or an FPGA (Field Programmable Gate Array). Also, the determination program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. Further, the determination program may be transmitted and received via a telecommunication line.

The joint information input unit 101 accepts an input of joint information from the user. For example, the joint information input unit 101 accepts an input of important joints among the joints of the subject, a confidence threshold creq for the important joints, and a confidence threshold cmin for specified joints. In the present embodiment, the subject is described as being a person for example, but the subject is not limited to being a person, and need only be a "living organism" that has a skeleton or joints. The joint information input unit 101 outputs the input joint information to the threshold setting unit 102. The confidence threshold creq for important joints is assigned a value equal to or higher than the confidence threshold for arbitrary joints. The confidence threshold cmin for specified joints is assigned the lowest value among the joints, including the confidence thresholds for other joints (important joints and other arbitrary joints).

The threshold setting unit 102 acquires the confidence thresholds for joints of the subject based on the joint information output from the joint information input unit 101, and sets the acquired confidence thresholds for joints as thresholds for use when the determination unit 106 makes a determination regarding skeletal estimation results of the subject.

The image input unit 103 accepts an input of an image that is to be subjected to state estimation. The image input unit 103 may read image data recorded on a recording medium such as a CD-ROM or a USB memory (Universal Serial Bus Memory). The image input unit 103 may also receive an image captured by a still camera or a video camera from that camera. The image input unit 103 may also receive image data from a network. The image input to the image input unit 103 may be a still image or a frame in a moving image. The image input unit 103 outputs the input image to the subject detection unit 104.

The subject detection unit 104 receives the image that was output by the image input unit 103. The subject detection unit 104 detects a subject in the input image. The subject detected by the subject detection unit 104 is a person, for example. The subject detection unit 104 outputs the detection result to the skeleton estimation unit 105.

The skeleton estimation unit 105 receives the detection result that was output by the subject detection unit 104. The skeleton estimation unit 105 estimates the positions of joints of the skeleton of the subject and confidence scores for the estimated positions based on the input detection result. The skeleton estimation unit 105 outputs the estimation results to the determination unit 106. The estimation results include information on the positions of joints of the skeleton of the subject and confidence scores for the estimated position.

The determination unit 106 receives the confidence thresholds for joints that were set by the threshold setting unit 102, and the estimation results that were output by the skeleton estimation unit 105. Based on the threshold values and the estimation results that were input, the determination unit 106 determines whether or not the skeletal information obtained from the input image is to be used for estimating the state of the subject.

Figure 2:
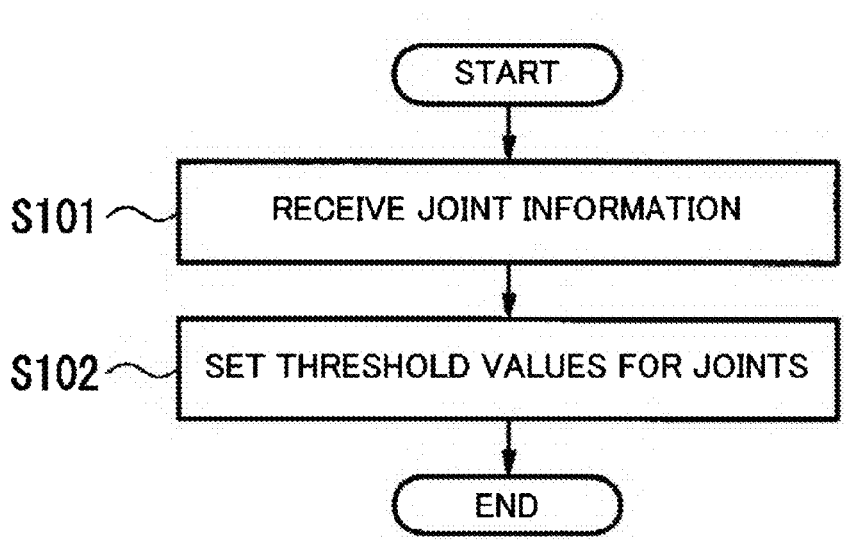
FIG. 2 is a flowchart showing a flow of threshold setting processing of the skeletal information determination device according to the first embodiment.

FIG. 2 is a flowchart showing a flow of threshold setting processing of the skeletal information determination device 10 according to the first embodiment.

The joint information input unit 101 receives joint information (step S101). Specifically, the joint information input unit 101 accepts an input of important joints among the joints of the subject, a confidence threshold creq for the important joints, and a confidence threshold cmin for the specified joints. The joint information input unit 101 outputs the input joint information to the threshold setting unit 102. The threshold setting unit 102 sets confidence thresholds for joints based on the joint information that was output by the joint information input unit 101 (step S102).

Figure 3:
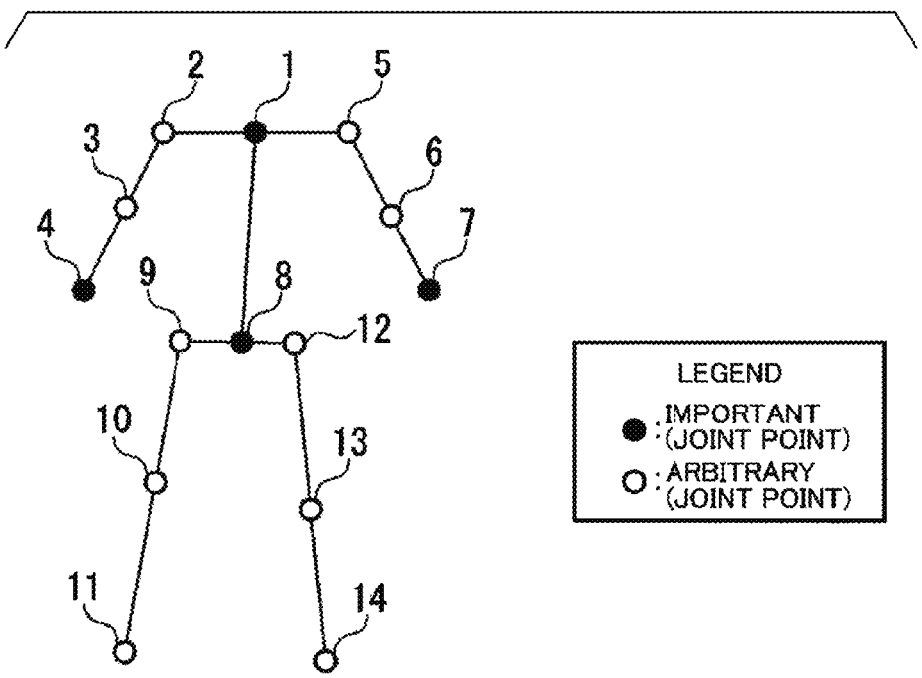
FIG. 3 is a diagram for describing an overview of processing of a threshold setting unit according to the first embodiment.
Figure 4:
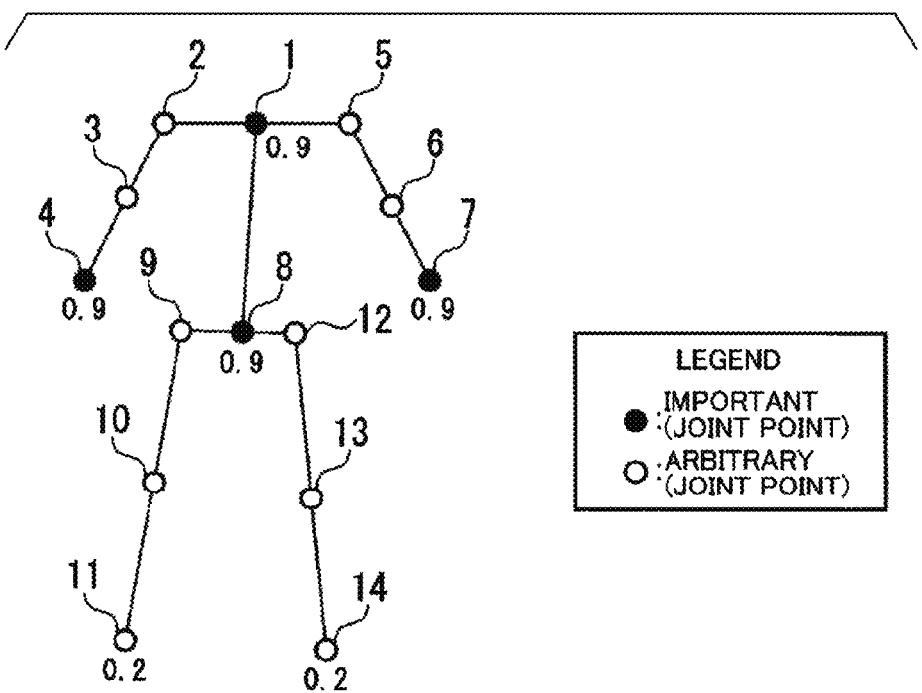
FIG. 4 is a diagram for describing an overview of processing of the threshold setting unit according to the first embodiment.

FIGS. 3 and 4 are diagrams for describing an overview of processing of the threshold setting unit 102 in the first embodiment.

As shown in FIG. 3, the joint points corresponding to important joints are n=1, 4, 7 and 8, and the joint points corresponding to arbitrary joints are n=2, 3, 5, 6, 9 to 11, and 12 to 14. Among the arbitrary joints, the joint points that correspond to specified joints are n=11 and 14. Then, the user inputs 0.9 as the confidence threshold creq for the important joints and 0.2 as the confidence threshold cmin for the specified joints. In this case, as shown in FIG. 4, the threshold setting unit 102 sets 0.9 as the confidence threshold creq for the joint points that correspond to important joints n=1, 4, 7 and 8, and sets 0.2 as the confidence threshold cmin for the joint points that correspond to specified joint points n=11 and 14.

When the above settings are made, the threshold setting unit 102 calculates and sets a threshold value for the joint points n=2, 3, 5, 6, 9, 10, 12 and 13 that correspond to other arbitrary joints for which no confidence threshold was set. The threshold values for the joint points n=2, 3, 5, 6, 9, 10, 12 and 13 corresponding to other arbitrary joints for which not confidence threshold was set are acquired by the threshold setting unit 102 based on the distance from important joints. For example, the threshold setting unit 102 acquires the threshold value by linear interpolation. The threshold setting unit 102 then sets the acquired threshold value for the joint points.

Figure 5:
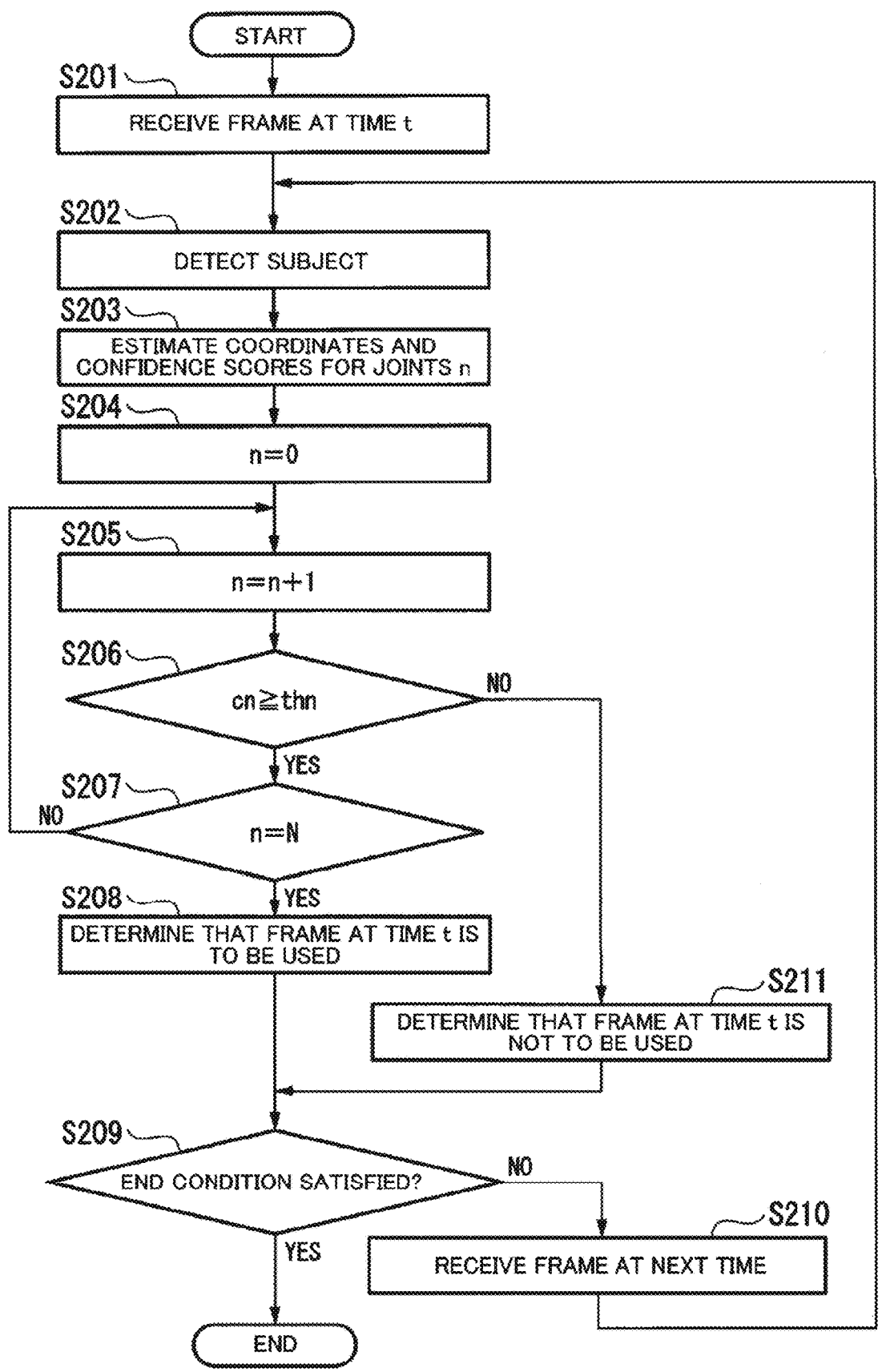
FIG. 5 is a flowchart showing a flow of determination processing of the skeletal information determination device according to the first embodiment.

FIG. 5 is a flowchart showing a flow of determination processing of the skeletal information determination device 10 according to the first embodiment. FIG. 5 illustrates an example of the case where a moving image is input to the skeletal information determination device 10. Further, in FIG. 5, it is assumed that confidence thresholds have been set by the threshold setting unit 102.

The image input unit 103 receives a frame corresponding to a time t (step S201). The image input unit 103 outputs the input frame to the subject detection unit 104. The subject detection unit 104 receives the frame that was output by the image input unit 103. The subject detection unit 104 detects a subject in the input frame (step S202). Conventional technology may be used as the method for detecting the subject. For example, the subject detection unit 104 may detect a subject in the frame by using Yolo technology. The subject detection unit 104 generates a partial region image by extracting a region that includes the subject from the frame. The subject detection unit 104 outputs the generated partial region image to the skeleton estimation unit 105.

Figures 6, 7:
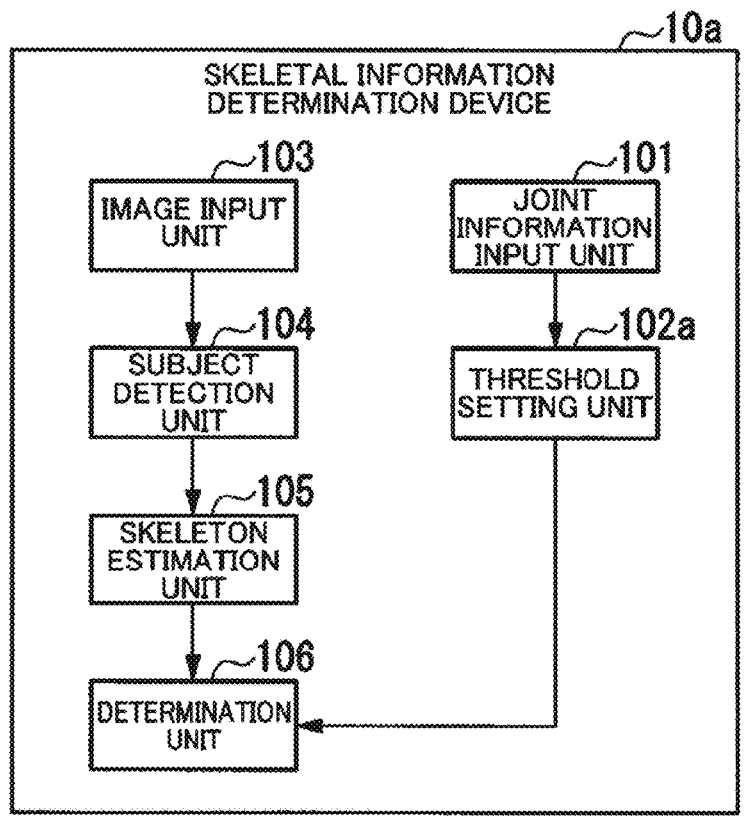
FIG. 6 is a diagram showing an example of an estimation result obtained by a skeleton estimation unit.
FIG. 7 is a schematic block diagram showing a configuration of a skeletal information determination device according to a second embodiment.

The skeleton estimation unit 105 receives the partial region image that was output by the subject detection unit 104 as a detection result. Based on the input partial region image, the skeleton estimation unit 105 estimates two-dimensional xy coordinates in the image and confidence scores cn for the joint points n (n being 1 to N, and N being the total number of joints) as skeletal information that includes joint points of the subject (step S203). FIG. 6 shows the estimation results obtained by the skeleton estimation unit 105. The skeleton estimation unit 105 outputs the estimation results to the determination unit 106.

The determination unit 106 receives the confidence thresholds for joints that were set by the threshold setting unit 102, and the estimation results that were output by the skeleton estimation unit 105. The determination unit 106 performs initialization by substituting 0 for the value of the joint point n (step S204). Next, the determination unit 106 adds 1 to the value of the joint point n (step S205). Next, the determination unit 106 determines whether or not the estimation result of the confidence score for the joint indicated by the value of the joint point n is greater than or equal to a threshold value thn (step S206). For example, if n is 1, the determination unit 106 determines whether or not the estimation result of the confidence score of the neck joint (0.9 in FIG. 6) is greater than or equal to the confidence threshold value th1 for the neck joint.

If the estimation result of the confidence score for the joint indicated by the joint point n is greater than or equal to the threshold value thn (step S206: YES), the determination unit 106 determines whether or not n=N (step S207). If n=N (step S207: YES), the determination unit 106 determines that the frame at the time t is to be used (step S208). Thereafter, the determination unit 106 determines whether or not an end condition is satisfied (step S209). The end condition is a condition for ending the determination processing performed by the skeletal information determination device 10. For example, the end condition may be that an end instruction was input to the skeletal information determination device 10 by the user, or that processing has been performed on all the images that were input to the skeletal information determination device 10.

If the end condition is satisfied (step S209: YES), the skeletal information determination device 10 ends the determination processing.

On the other hand, if the end condition is not satisfied (step S209: NO), the image input unit 103 inputs a frame corresponding to the next time (e.g., the frame at the time t=t+1) (step S210). Thereafter, processing is executed from step S202.

If n=N is not satisfied in the processing of step S207 (step S207: NO), the determination unit 106 executes the processing of step S205.

In the processing of step S206, if the estimation result of the confidence score for the joint indicated by the joint point n is less than the threshold value thn (step S206: NO), the determination unit 106 determines that the frame at the time t is not to be used (step S211). Thereafter, the determination unit 106 executes the processing of step S209.

According to the skeletal information determination device 10 configured as described above, important joints among the joints of the subject and a confidence threshold creq for the important joints are input. Then, in the skeletal information determination device 10, confidence thresholds for joints of the subject, including the important joints, are acquired based on the important joints and the confidence threshold creq for the important joints that were input, and the acquired confidence thresholds for joints are set as thresholds for use when making a determination regarding skeletal estimation results of the subject. The skeletal information determination device 10 can then automatically determine the quality of the skeletal estimation results of the subject by using the set threshold values.

Also, depending on the scene captured in the image, even if the confidence score of the skeletal information is not high for the whole body, there are cases where some of the skeletal information is correct (has a high confidence score). For example, in the case of baseball swing scene detection, it is the upper body that is important, and in the case of falling or down scene detection, it is the spine, the lower body, and the like that are important. In the present invention, the confidence threshold can be freely set for each joint by the user. By setting the threshold value according to the scene in this way, it is possible to determine the quality of the skeletal estimation result of the subject according to the scene.

Second Embodiment

In a second embodiment, the threshold setting unit acquires, through linear interpolation, confidence thresholds for an arbitrary joint located between important joints, an arbitrary joint located between an important joint and a specified joint, and an arbitrary joint located between specified joints.

FIG. 7 is a schematic block diagram showing the configuration of a skeletal information determination device 10a according to the second embodiment.

The skeletal information determination device 10a is constituted by an information processing device such as a smartphone, a mobile phone, a tablet terminal, a notebook computer, or a personal computer. The skeletal information determination device 10a includes a CPU, a memory, an auxiliary storage device, and the like, which are connected by a bus, and executes a determination program. By executing the determination program, the skeletal information determination device 10a functions as a device that includes a joint information input unit 101, a threshold setting unit 102a, an image input unit 103, a subject detection unit 104, a skeleton estimation unit 105, and a determination unit 106. Note that some or all of the functions of the skeletal information determination device 10a may be realized using hardware such as an ASIC, a PLD, or an FPGA. Also, the determination program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. Further, the determination program may be transmitted and received via a telecommunication line.

The configuration of the skeletal information determination device 10a is different from that of the skeletal information determination device 10 in that the threshold setting unit 102a is provided instead of the threshold setting unit 102. Other aspects of the configuration of the skeletal information determination device 10a are similar to those of the skeletal information determination device 10. For this reason, the entirety of the skeletal information determination device 10a will not be described, and only the threshold setting unit 102a is described below.

The threshold setting unit 102a acquires confidence thresholds for joints based on the joint information output from the joint information input unit 101, and sets the acquired confidence thresholds for joints as thresholds that are to be used in the determination processing performed by the determination unit 106. More specifically, the threshold setting unit 102a acquires, through linear interpolation, confidence thresholds for an arbitrary joint located between important joints, an arbitrary joint located between an important joint and a specified joint, and an arbitrary joint located between specified joints. The threshold setting unit 102a then sets the acquired confidence thresholds for joints as the threshold values that are to be used in the determination processing performed by the determination unit 106.

The threshold setting unit 102a sets the confidence threshold creq for important joints and the confidence threshold cmin for specified joints for the joint points corresponding to the joints according to the following preconditions (1) to (3). Thereafter, for joint points corresponding to other arbitrary joints for which a confidence threshold was not set, the threshold setting unit 102a sets a confidence threshold for other arbitrary joints.

(1) Set threshold creq for important joints included in the joint information for joint points corresponding to important joints (2) Set threshold cmin for specified joints included in the joint information for joint points corresponding to specified joints (3) If either the neck (joint point n=1) or the center of the waist (joint point n=8), which are branch points, is an arbitrary joint, set the confidence threshold cmin for the neck (joint point n=1) or the center of the waist (joint point n=8) that is an arbitrary joint such that the path including the joint does not branch.

The following describes the reason for the setting of precondition (3). For example, when determining the threshold value for the joint point n=10, the downward direction (joint point n=11 side) is uniquely determined, but when the upward direction (joint point n=9 side) is followed, a branch (joint point n=1 or joint point n=12) occurs at the joint at the joint point n=8. In order to prevent such branching, if a branching joint is an arbitrary joint, the threshold setting unit 102a sets the confidence threshold cmin for the joint point corresponding to the specified joint in (2).

Figure 8:
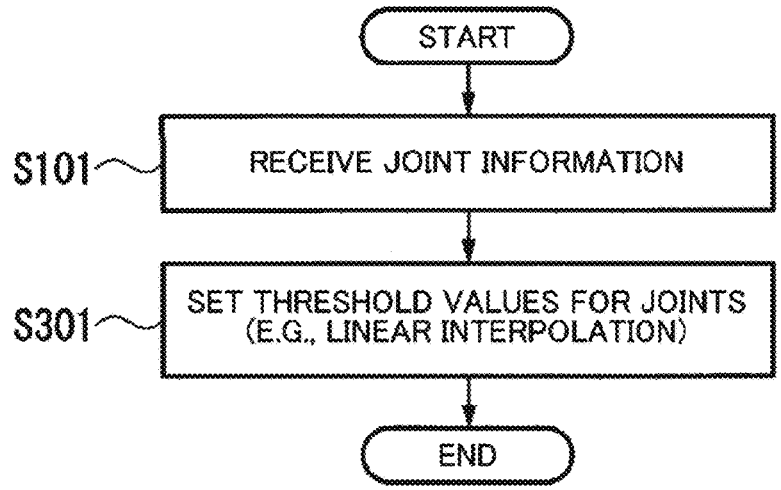
FIG. 8 is a flowchart showing a flow of threshold setting processing of the skeletal information determination device according to the second embodiment.

FIG. 8 is a flowchart showing a flow of threshold setting processing of the skeletal information determination device 10a according to the second embodiment. In FIG. 8, processing similar to that in FIG. 2 is designated by the same reference numerals as in FIG. 2, and will not be described.

After the processing of step S101, the threshold setting unit 102a sets confidence thresholds for joints based on the joint information that was output by the joint information input unit 101 (step S301). The following describes specific processing of the threshold setting unit 102a with reference to FIGS. 9 and 10.

Figure 9:
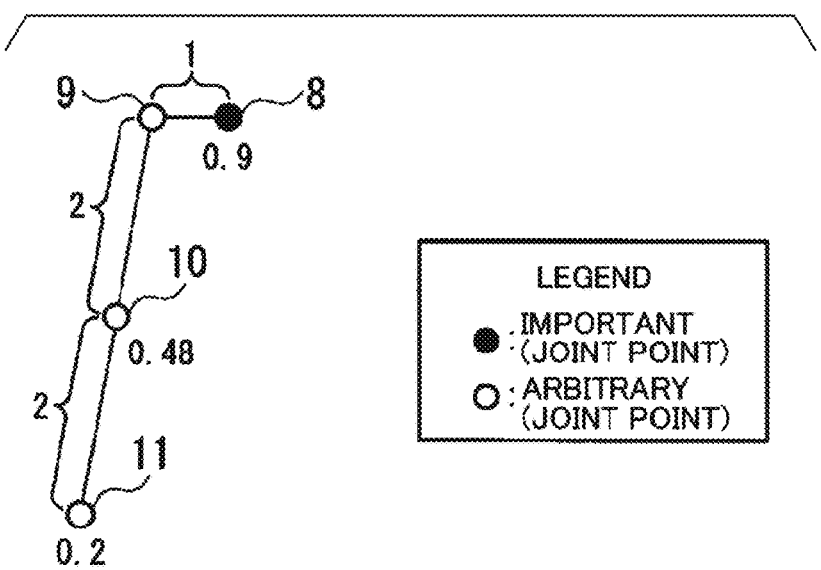
FIG. 9 is a diagram for describing an overview of processing of the threshold setting unit according to the second embodiment.
Figure 10:
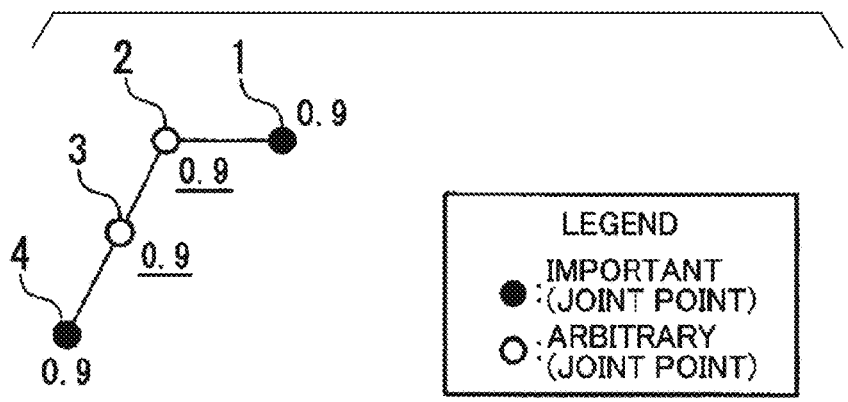
FIG. 10 is a diagram for describing an overview of processing of the threshold setting unit according to the second embodiment.

FIGS. 9 and 10 are diagrams for describing an overview of processing of the threshold setting unit 102a in the second embodiment. The processing shown in FIGS. 9 and 10 is executed after the processing in sections (1) to (3) above has been performed. FIG. 9 describes processing in which a confidence threshold for an arbitrary joint located between an important joint and a specified joint is set for a joint point that corresponds to an arbitrary joint located between an important joint and a specified joint. FIG. 10 describes processing in which a confidence threshold for an arbitrary joint located between important joints is set for a joint point that corresponds to an arbitrary joint located between important joints.

First, FIG. 9 will be used to describe processing in which a confidence threshold for an arbitrary joint is set for a joint point that corresponds to an arbitrary joint located between an important joint and a specified joint.

As shown in FIG. 9, in the case where 0.9 has been set as the confidence threshold value at the joint point n=8 corresponding to an important joint and 0.2 has been set as the confidence threshold value at the joint point n=11 corresponding to a specified joint, the threshold setting unit 102a acquires the confidence threshold values for the joint points n=9 and n=10 corresponding to arbitrary joints as follows. The following describes an example of acquiring the confidence threshold value for the joint point n=10. Here, the distance between the joint points n=11 and n=10 and the distance between the joint points n=10 and n=9 are 2, and distance between the joint points n=9 and n=8 is 1. In this case, the threshold setting unit 102a acquires the confidence threshold value for the joint point n=10 in accordance with (0.9−0.2)*2/5+0.2=0.48.

Next, FIG. 10 will be used to describe processing for setting the confidence threshold value for an arbitrary joint.

As shown in FIG. 10, in the case where 0.9 has been set as the confidence threshold value for the joint points n=1 and n=4 corresponding to important joints, the threshold setting unit 102a acquires the confidence threshold value for the joint points n=2 and n=3 corresponding to arbitrary joints located between important joints as follows. Specifically, because the same value has been set for the joint points n=1 and n=4 corresponding to important joints, the confidence threshold is also 0.9 for the joint points n=2 and n=3 corresponding to arbitrary joints located between important joints.

According to the above processing, the threshold setting unit 102a acquires, through linear interpolation, confidence thresholds for an arbitrary joint located between important joints, an arbitrary joint located between an important joint and a specified joint, and an arbitrary joint located between specified joints.

The skeletal information determination device 10a having the above configuration acquires, through linear interpolation, confidence thresholds for an arbitrary joint located between important joints, an arbitrary joint located between an important joint and a specified joint, and an arbitrary joint located between specified joints. The skeletal information determination device 10 can then automatically determine the quality of the skeletal estimation results of the subject by using the acquired threshold values.

Third Embodiment

In the second embodiment, the confidence threshold for an arbitrary joint located between important joints is set to the same value as the threshold set for a joint point that corresponds to an important joint. Here, in a third embodiment, the threshold setting unit acquires, through linear interpolation, a confidence threshold for an arbitrary joint located between an important joint and a specified joint and an arbitrary joint located between specified joints, and sets a predetermined value as a threshold for an intermediate point between important joints and acquires, through linear interpolation, a confidence threshold for an arbitrary joint located between important joints.

Figure 11:
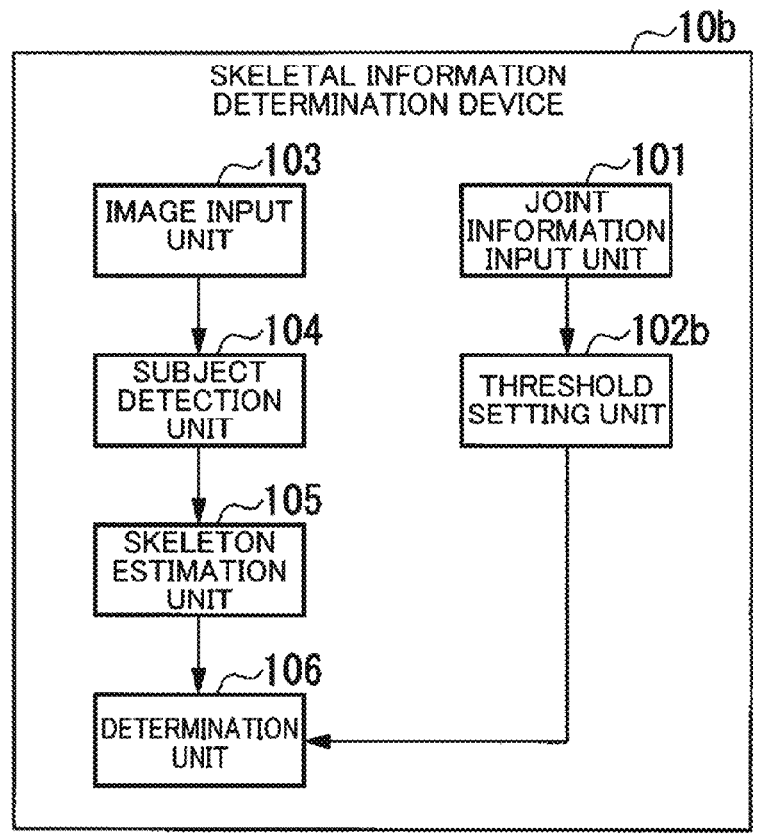
FIG. 11 is a schematic block diagram showing a configuration of a skeletal information determination device according to a third embodiment.

FIG. 11 is a schematic block diagram showing the configuration of a skeletal information determination device 10b according to the third embodiment.

The skeletal information determination device 10b is constituted by an information processing device such as a smartphone, a mobile phone, a tablet terminal, a notebook computer, or a personal computer. The skeletal information determination device 10b includes a CPU, a memory, an auxiliary storage device, and the like, which are connected by a bus, and executes a determination program. By executing the determination program, the skeletal information determination device 10b functions as a device that includes a joint information input unit 101, a threshold setting unit 102b, an image input unit 103, a subject detection unit 104, a skeleton estimation unit 105, and a determination unit 106. Note that some or all of the functions of the skeletal information determination device 10b may be realized using hardware such as an ASIC, a PLD, or an FPGA. Also, the determination program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. Further, the determination program may be transmitted and received via a telecommunication line.

The configuration of the skeletal information determination device 10b is different from that of the skeletal information determination device 10 in that the threshold setting unit 102b is provided instead of the threshold setting unit 102. Other aspects of the configuration of the skeletal information determination device 10b are similar to those of the skeletal information determination device 10. For this reason, the entirety of the skeletal information determination device 10b will not be described, and only the threshold setting unit 102b is described below.

The threshold setting unit 102b acquires confidence thresholds for joints based on the joint information output from the joint information input unit 101, and sets the acquired confidence thresholds for joints as thresholds that are to be used in the determination processing performed by the determination unit 106. More specifically, for a joint point that corresponds to an arbitrary joint located between important joints, the threshold setting unit 102b sets a lower threshold the greater the distance from an important joint serving as a reference is. Here, the reference important joint is the important joint that is located on the upstream side (e.g., closer to the head) out of the important joints that sandwich the arbitrary joint. For example, as shown in FIG. 3, if the joint points corresponding to important joints are the joint points n=1 and n=4, the reference important joint is the joint point n=1. Note that the reference important joint is not limited to being on the upstream side, and may be the important joint that is located on the downstream side (e.g., closer to the foot).

Similarly to the second embodiment, the threshold setting unit 102b sets the confidence threshold creq for important joints and the confidence threshold cmin for specified joints for the joint points corresponding to the joints according to the following preconditions (1) to (3). Thereafter, the threshold setting unit 102b sets a confidence threshold for joint points corresponding to other arbitrary joints for which a confidence threshold was not set.

Figure 12:
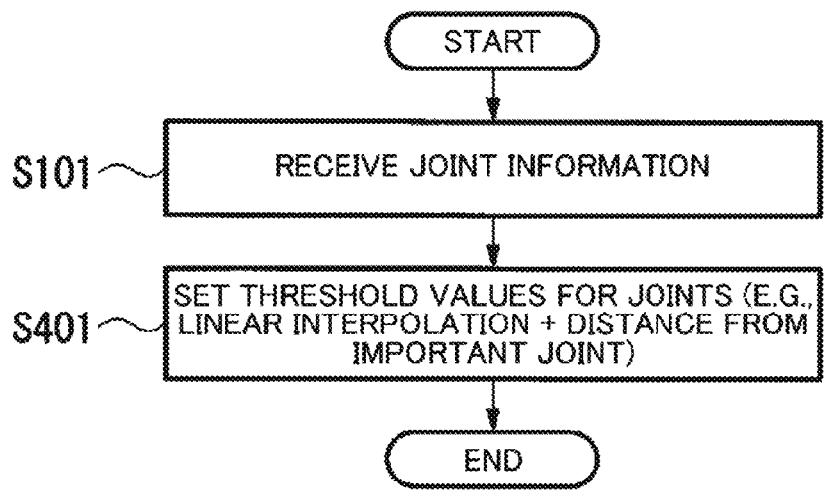
FIG. 12 is a flowchart showing a flow of threshold setting processing of the skeletal information determination device according to the third embodiment.

FIG. 12 is a flowchart showing a flow of threshold setting processing of the skeletal information determination device 10b according to the third embodiment. In FIG. 12, processing similar to that in FIG. 2 is designated by the same reference numerals as in FIG. 2, and will not be described.

After the processing of step S101, the threshold setting unit 102b sets confidence thresholds for joints based on the joint information that was output by the joint information input unit 101 (step S401). The following describes specific processing of the threshold setting unit 102b with reference to FIG. 13.

Figure 13:
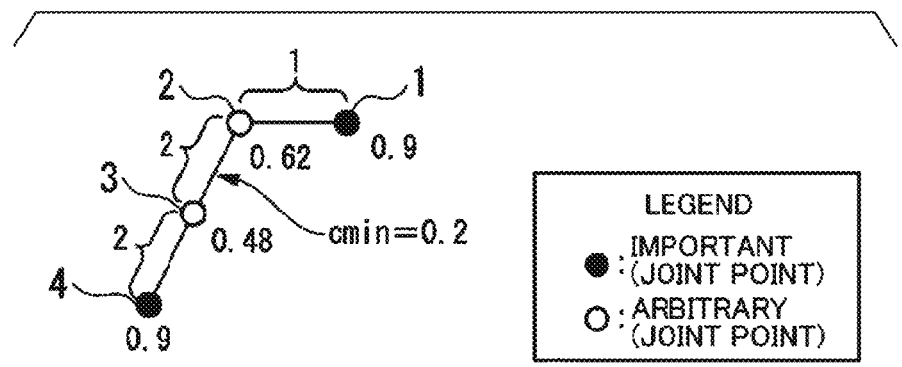
FIG. 13 is a diagram for describing threshold setting processing performed by the skeletal information determination device according to the third embodiment.

FIG. 13 is a diagram for describing threshold setting processing performed by the skeletal information determination device 10b in the third embodiment. Note that the processing shown in FIG. 13 is executed after the processing in sections (1) to (3) above has been performed. As shown in FIG. 13, in the case where 0.9 has been set as the confidence threshold value for the joint points n=1 and n=4 corresponding to important joints, the threshold setting unit 102b acquires the confidence threshold value for the joint points n=2 and n=3 corresponding to arbitrary joints as follows.

Specifically, even when an arbitrary joint is located between important joint, the threshold setting unit 102b sets a lower confidence threshold the greater the distance from an important joint is. Here, the distance between the joint points n=4 and n=3 and the distance between the joint points n=3 and n=2 are 2, and distance between the joint points n=2 and n=1 is 1. Here, in order to ensure a minimum confidence threshold value, the threshold setting unit 102b sets the confidence threshold value cmin for an intermediate point between important joints (in this case, a point at a distance of 2.5 from the joint point n=1 or n=4). Then, through linear interpolation, the threshold setting unit 102b calculates a confidence threshold value th2 for the joint point n=2 and a confidence threshold value th3 for the joint point n=3 as follows.

threshold $th2=(0.9-0.2)\times 1.5/2.5+0.2=(0.9-0.2)\times 3/5+0.2=0.62$ threshold $th3=(0.9-0.2)\times 2/5+0.2=0.48$ The above has described a configuration for acquiring a confidence threshold for an arbitrary joint located between important joints. The threshold setting unit 102b uses a method similar to that of the second embodiment to acquire a confidence threshold value for an arbitrary joint located between an important joint and a specified joint and an arbitrary joint located between specified joints.

According to the above processing, the threshold setting unit 102b acquires, through linear interpolation, confidence thresholds for an arbitrary joint located between important joints, an arbitrary joint located between an important joint and a specified joint, and an arbitrary joint located between specified joints.

The skeletal information determination device 10b having the above configuration acquires, through linear interpolation, confidence thresholds for an arbitrary joint located between an important joint and a specified joint and an arbitrary joint located between specified joints. Also, the skeletal information determination device 10b sets a predetermined value as a threshold for an intermediate point between important joints and acquires, through linear interpolation, a confidence threshold for an arbitrary joint located between important joints. The skeletal information determination device 10 can then automatically determine the quality of the skeletal estimation results of the subject by using the acquired threshold values.

In particular, in the second embodiment, the confidence threshold for an arbitrary joint located between important joints is set to the same value as the confidence threshold for an important joint. In contrast, in the third embodiment, the farther an arbitrary joint is from an important joint, the smaller the threshold value, which is lower than the threshold set for an important joint, is set. In this way, in the third embodiment, greater importance is given to the quality of important joints.

Fourth Embodiment

In a fourth embodiment, the threshold setting unit acquires, through linear interpolation, confidence thresholds for an arbitrary joint located between an important joint and a specified joint and an arbitrary joint located between specified joints, and sets a pre-set predetermined value as the confidence threshold for an arbitrary joint located between important joints.

Figure 14:
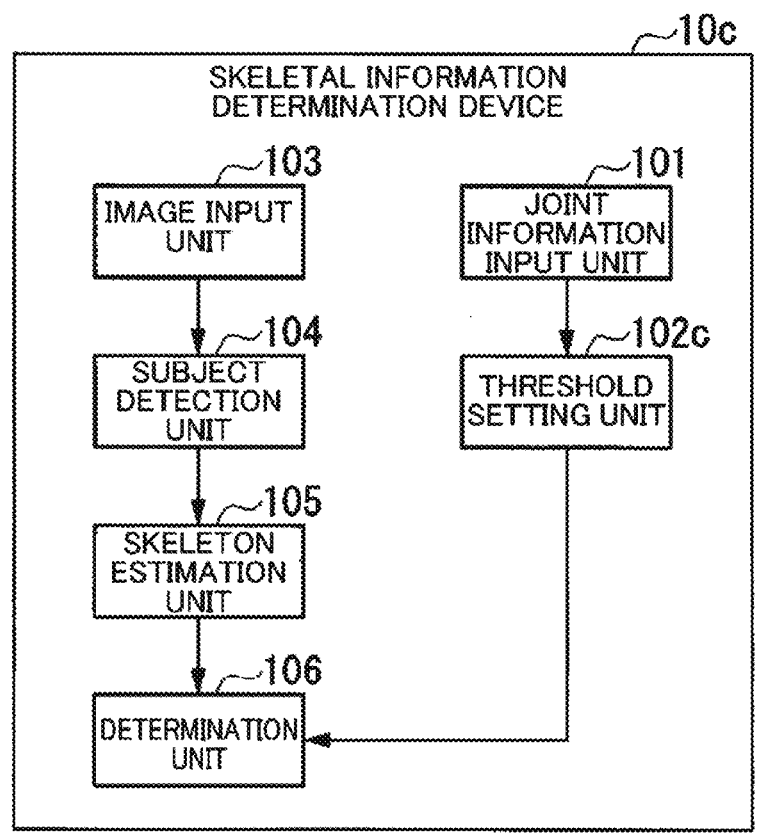
FIG. 14 is a schematic block diagram showing a configuration of a skeletal information determination device according to a fourth embodiment.

FIG. 14 is a schematic block diagram showing the configuration of a skeletal information determination device 10c according to the fourth embodiment.

The skeletal information determination device 10c is constituted by an information processing device such as a smartphone, a mobile phone, a tablet terminal, a notebook computer, or a personal computer. The skeletal information determination device 10c includes a CPU, a memory, an auxiliary storage device, and the like, which are connected by a bus, and executes a determination program. By executing the determination program, the skeletal information determination device 10c functions as a device that includes a joint information input unit 101, a threshold setting unit 102c, an image input unit 103, a subject detection unit 104, a skeleton estimation unit 105, and a determination unit 106. Note that some or all of the functions of the skeletal information determination device 10c may be realized using hardware such as an ASIC, a PLD, or an FPGA. Also, the determination program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. Further, the determination program may be transmitted and received via a telecommunication line.

The configuration of the skeletal information determination device 10c is different from that of the skeletal information determination device 10a in that the threshold setting unit 102c is provided instead of the threshold setting unit 102a. Other aspects of the configuration of the skeletal information determination device 10c are similar to those of the skeletal information determination device 10a. For this reason, the entirety of the skeletal information determination device 10c will not be described, and only the threshold setting unit 102c is described below.

The threshold setting unit 102c acquires confidence thresholds for joints based on the joint information output from the joint information input unit 101, and sets the acquired confidence thresholds for joints as thresholds that are to be used in the determination processing performed by the determination unit 106. More specifically, the threshold setting unit 102c acquires, through linear interpolation, confidence thresholds for an arbitrary joint located between an important joint and a specified joint and an arbitrary joint located between specified joints, and sets a pre-set predetermined value as the confidence threshold for an arbitrary joint located between important joints. The threshold setting unit 102c then sets the acquired confidence thresholds for joints as the threshold values that are to be used in the determination processing performed by the determination unit 106.

Similarly to the second embodiment, the threshold setting unit 102c sets the confidence threshold creq for important joints and the confidence threshold cmin for specified joints for the joint points corresponding to the joints according to the following preconditions (1) to (3). Thereafter, the threshold setting unit 102c sets a confidence threshold for joint points corresponding to other arbitrary joints for which a confidence threshold was not set.

Figure 15:
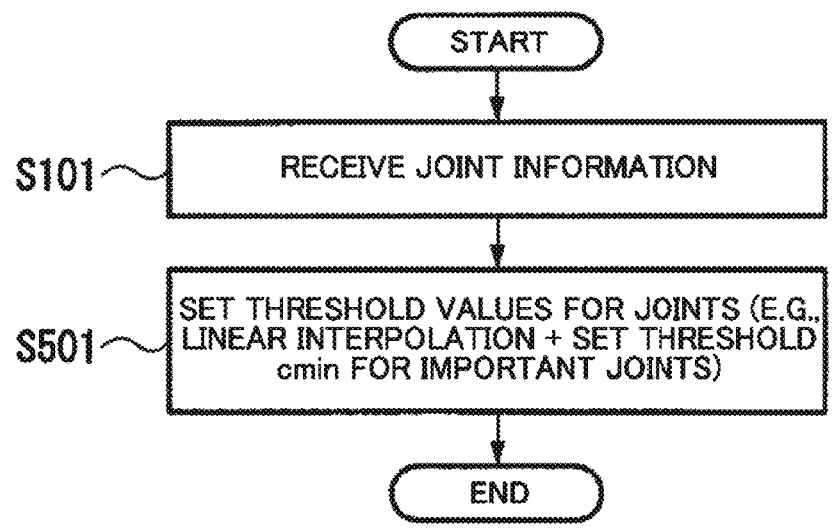
FIG. 15 is a flowchart showing a flow of threshold setting processing of the skeletal information determination device according to the fourth embodiment.

FIG. 15 is a flowchart showing a flow of threshold setting processing of the skeletal information determination device 10c according to the fourth embodiment. In FIG. 15, processing similar to that in FIG. 2 is designated by the same reference numerals as in FIG. 2, and will not be described.

After the processing of step S101, the threshold setting unit 102c sets confidence thresholds for joints based on the joint information that was output by the joint information input unit 101 (step S501). The following describes specific processing of the threshold setting unit 102c with reference to FIG. 16.

Figure 16:
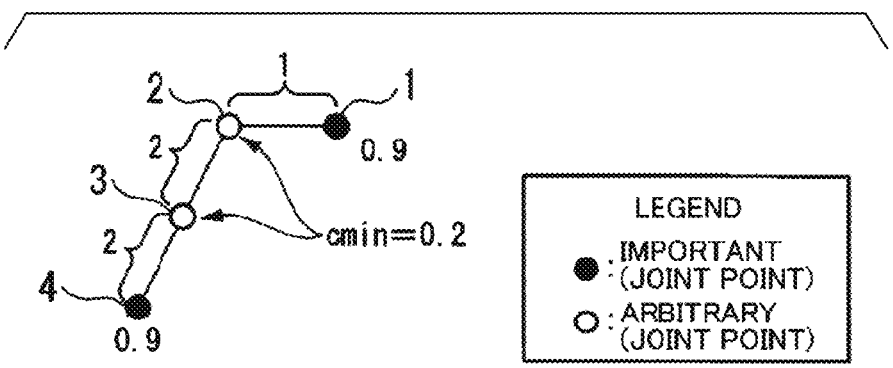
FIG. 16 is a diagram for describing threshold setting processing performed by the skeletal information determination device according to the fourth embodiment.
Figures 18, 19:
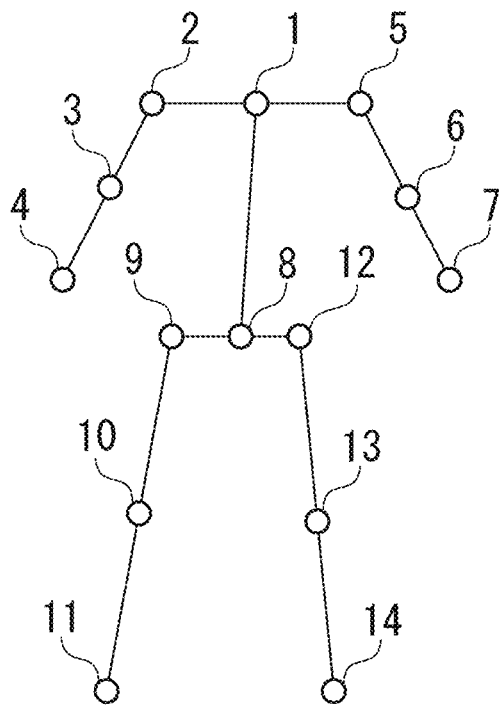
FIG. 18 is a diagram showing an example of joint points of a human body.
FIG. 19 is a diagram showing an example of skeletal information in a frame.

FIG. 16 is a diagram for describing threshold setting processing performed by the skeletal information determination device 10c in the fourth embodiment. Note that the processing shown in FIG. 16 is executed after the processing in sections (1) to (3) above has been performed. As shown in FIG. 16, in the case where 0.9 has been set as the confidence threshold value for the joint points n=1 and n=4 corresponding to important joints, the threshold setting unit 102c acquires the confidence threshold value for the joint points n=2 and n=3 corresponding to arbitrary joints as follows.

Specifically, if the arbitrary point is located between important joints, the threshold setting unit 102b sets the confidence threshold cmin for the joint point that corresponds to the sandwiched arbitrary joint. In the present embodiment, the confidence threshold value cmin is 0.2, and therefore the threshold setting unit 102b sets 0.2 as the confidence threshold value for the joint points n=2 and n=3 that correspond to arbitrary joints. According to this configuration, if an arbitrary joint is sandwiched between important joints, the importance thereof is thought to be low regardless of the distance due to being arranged between important joints, and therefore only the minimum confidence score is ensured.

The above has described a configuration for acquiring a confidence threshold for an arbitrary joint located between important joints. The threshold setting unit 102c uses a method similar to that of the second embodiment to acquire a confidence threshold value for an arbitrary joint located between an important joint and a specified joint and an arbitrary joint located between specified joints. Through this processing, in the case of an arbitrary joint that is located between an important joint and a specified joint, the threshold setting unit 102c acquires a lower threshold value, which is lower than the threshold value set for an important joint, the greater the distance from the important joint is.

The skeletal information determination device 10c having the above configuration acquires, through linear interpolation, confidence thresholds for an arbitrary joint located between an important joint and a specified joint and an arbitrary joint located between specified joints, and sets a pre-set predetermined value as the confidence threshold for an arbitrary joint located between important joints. The skeletal information determination device 10 can then automatically determine the quality of the skeletal estimation results of the subject by using the set threshold values.

FIG. 17 is a diagram for describing a difference in the threshold setting method between the present invention and conventional technology.

As shown in FIG. 17, in conventional technology, the confidence thresholds set for joint points that correspond to an arbitrary joint are all fixed values. In such a case, if the confidence estimation result for a joint that is not particularly important is low, the corresponding skeletal information is deleted. On the other hand, in the present invention, the confidence threshold is obtained through linear interpolation based on the distance from an important joint. Importance is placed on different points in the second to fourth embodiments. For this reason, such techniques can be applied as appropriate according to the scene. As a result, convenience can be improved.

Variations Common to the First to Fourth Embodiments

In the above embodiments, the threshold setting units 102, 102a, 102b, and 102c are configured to set one confidence threshold creq for joint points that correspond to an important joint, the present invention is not necessarily limited to this. For example, the threshold setting units 102, 102a, 102b, 102c may be configured to set multiple confidence thresholds creq for joint points that correspond to an important joint. In the case of such a configuration, the joint information input unit 101 accepts an input of multiple confidence thresholds creq from the user for each important joint. The threshold setting units 102, 102a, 102b, and 102c set the confidence thresholds creq that were received by the joint information input unit 101 for the joint point that corresponds to the important joint.

A portion of the functional units of the skeletal information determination devices 10, 10a, 10b, and 10c may be implemented in another device. For example, the joint information input unit 101 and the threshold setting units 102, 102a, 102b, and 102c included in the skeletal information determination devices 10, 10a, 10b, and 10c may be provided as a skeletal information threshold setting apparatus in another housing. In the case of this configuration, the skeletal information determination devices 10, 10a, 10b, and 10c acquire a confidence threshold value for each joint output from the skeletal information threshold setting apparatus, and, using the acquired threshold values, determine whether or not the skeletal information obtained from an input image is used when estimating the state of a subject. The skeletal information threshold setting apparatus may be a server provided in the cloud, or may be provided at a place different from where the skeletal information determination device 10 is provided.

INDUSTRIAL APPLICABILITY

The present invention can be applied to the estimation of the state of a subject using skeletal information.

REFERENCE SIGNS LIST 10, 10a, 10b, 10c Skeletal information determination device
101 Joint information input unit
102, 102a, 102b, 102c Threshold setting unit
103 Image input unit
104 Subject detection unit 105 Skeleton estimation unit
106 Determination unit

The invention claimed is:

1. A skeletal information threshold setting apparatus comprising:
   a joint information inputter configured to accept an input of an important joint among multiple joints of a subject and a confidence threshold for the important joint;
   a threshold setter configured to acquire a confidence threshold for each of multiple joints of the subject including the important joint based on the important joint and the confidence threshold for the important joint that were input, and to set the acquired confidence thresholds for the joints as thresholds to be used in making a determination regarding a skeletal estimation result for the subject, wherein the threshold setter sets a higher threshold for the important joint among the multiple joints of the subject than for a non-important joint,
   an image input unit configured to receive an image of the subject from an image device;
   a skeleton detection unit configured to receive the image and estimate positions of joints of the subject from the received image;
   a determination unit configured to determine whether to use the estimated position of the joints based on the confidence thresholds; and diagnose posture of the subject using the estimated position of the joints in response to the confidence thresholds exceeding a threshold;
   wherein each of the joint information inputter, threshold setter, the image input unit, the skeleton detection unit and the determination unit is implemented by:
      i) computer executable instructions executed by at least one processor,
      ii) at least one circuitry or
      iii) a combination of computer executable instructions executed by at least one processor and at least one circuitry.

2. The skeletal information threshold setting apparatus according to claim 1, wherein the threshold setter acquires a threshold for a non-important joint based on the distance from the important joint.

3. The skeletal information threshold setting apparatus according to claim 1, wherein the threshold setter sets a lower threshold, which is smaller than the threshold set for the important joint, the greater the distance from the important joint is.

4. The skeletal information threshold setting apparatus according to claim 1, wherein the threshold setter acquires, through linear interpolation, confidence thresholds for a non-important joint located between important joints, a non-important joint located between an important joint and an arbitrary joint for which a threshold was set in advance, and a non-important joint located between arbitrary joints for which a threshold was set in advance.

5. The skeletal information threshold setting apparatus according to claim 1, wherein the threshold setter acquires, through linear interpolation, confidence thresholds for a non-important joint located between an important joint and an arbitrary joint for which a threshold was set in advance, and a non-important joint located between arbitrary joints for which a threshold was set in advance, and sets a predetermined value as a threshold for an intermediate point between important joints and acquires, through linear interpolation, a confidence threshold for a non-important joint located between important joints.

6. The skeletal information threshold setting apparatus according to claim 1, wherein the threshold setter acquires, through linear interpolation, confidence thresholds for a non-important joint located between an important joint and an arbitrary joint for which a threshold was set in advance, and a non-important joint located between arbitrary joints for which a threshold was set in advance, and sets a pre-set predetermined value as a confidence threshold for a non-important joint located between important joints.

7. A skeletal information threshold setting method comprising:
   accepting, by a computer processor, an input of an important joint among multiple joints of a subject and a confidence threshold for the important joint; and
   acquiring, by the computer processor, a confidence threshold for each of multiple joints of the subject including the important joint based on the important joint and the confidence threshold for the important joint that were input, and setting the acquired confidence thresholds for the joints as thresholds to be used in making a determination regarding a skeletal estimation result for the subject; wherein in the setting include setting a higher threshold for the important joint among the multiple joints of the subject than for a non-important joint;
   receiving, by the computer processor, an image of the subject from an image device;
   estimating, by the computer processor, positions of joints of the subject from the received image;
   determining, by the computer processor, whether to use the estimated position of the joints based on the confidence thresholds; and
   diagnosing posture of the subject using the estimated position of the joints in response to the confidence thresholds exceeding a threshold.

8. A non-transitory computer readable storage medium that stores a computer program that, upon execution of the computer program by a processor of a computer, cause the computer to:
   accepting an input of an important joint among multiple joints of a subject and a confidence threshold for the important joint;
   acquiring a confidence threshold for each of multiple joints of the subject including the important joint based on the important joint and the confidence threshold for the important joint that were input, and setting the acquired confidence thresholds for the joints as thresholds to be used in making a determination regarding a skeletal estimation result for the subject; wherein in the setting include setting a higher threshold for the important joint among the multiple joints of the subject than for a non-important joint;
   receiving an image of the subject from an image device;
   estimating positions of joints of the subject from the received image;
   determining whether to use the estimated position of the joints based on the confidence thresholds; and
   diagnosing posture of the subject using the estimated position of the joints in response to the confidence thresholds exceeding a threshold.

* * * * *